(12) United States Patent
Bagepalli et al.

(10) Patent No.: US 7,997,855 B2
(45) Date of Patent: Aug. 16, 2011

(54) LUBRICATION HEATING SYSTEM AND WIND TURBINE INCORPORATING SAME

(75) Inventors: Bharat S. Bagepalli, Niskayuna, NY (US); Edwin Hidding, Rhede (DE); Stephan Klümper, Gronau (DE); Eric A. Baker, Scotia, NY (US); Holger Grünwaldt, Hohenaspe (DE); Michael J. Burkett, Lyman, SC (US)

(73) Assignee: General Electric Company, Schenectady, NY (US)

( * ) Notice: Subject to any disclaimer, the term of this patent is extended or adjusted under 35 U.S.C. 154(b) by 870 days.

(21) Appl. No.: 12/021,482

(22) Filed: Jan. 29, 2008

(65) Prior Publication Data
US 2009/0191060 A1     Jul. 30, 2009

(51) Int. Cl.
*F01D 25/08* (2006.01)

(52) U.S. Cl. ......... 415/114; 415/4.1; 415/178; 415/179; 416/174

(58) Field of Classification Search ............. 415/4.1, 415/114, 175, 176, 177, 178, 179; 416/174; 290/44, 55
See application file for complete search history.

(56) References Cited

U.S. PATENT DOCUMENTS

| | | | |
|---|---|---|---|
| 4,596,209 A | 6/1986 | Haslach, Jr. | |
| 6,520,737 B1 * | 2/2003 | Fischer et al. | 415/4.3 |
| 6,676,122 B1 * | 1/2004 | Wobben | 290/55 |
| 7,111,668 B2 * | 9/2006 | Rurup | 165/134.1 |
| 7,168,251 B1 * | 1/2007 | Janssen | 60/641.1 |
| 7,312,544 B2 | 12/2007 | Laskaris et al. | |
| 7,748,946 B2 * | 7/2010 | Wan | 415/1 |
| 2005/0167989 A1 * | 8/2005 | Kruger-Gotzmann et al. | 290/55 |
| 2007/0024132 A1 | 2/2007 | Salamah et al. | |
| 2007/0132247 A1 * | 6/2007 | Galayda et al. | 290/44 |
| 2007/0222223 A1 | 9/2007 | Bagepalli et al. | |

* cited by examiner

*Primary Examiner* — Igor Kershteyn
(74) *Attorney, Agent, or Firm* — James W. Pemrick; Ernest G. Cusick; Frank A. Landgraff

(57) ABSTRACT

A wind turbine is provided having a gearbox containing a lubrication medium, a pump for circulating the lubrication medium, and a gearbox lubrication suction pipe for transporting the lubrication medium from the gearbox to the pump. A heater is in thermal connection to, at least a portion of, the gearbox lubrication suction pipe. This heater is used to heat the lubrication medium contained within the gearbox lubrication suction pipe to a temperature where damage to the pump is avoided.

20 Claims, 4 Drawing Sheets

LUBRICATION HEATING SYSTEM AND WIND TURBINE INCORPORATING SAME

BACKGROUND OF THE INVENTION

This invention relates generally to rotary machines and more particularly, to a lubrication heating system for operating wind turbines in cold weather environments.

Generally, a wind turbine includes a rotor having multiple blades. The blades are attached to a rotatable hub, and the blades and hub are often called the rotor. The rotor transforms mechanical wind energy into a mechanical rotational torque that drives one or more generators. The generators are generally, but not always, rotationally coupled to the rotor through a gearbox. The gearbox steps up the inherently low rotational speed of the turbine rotor for the generator to efficiently convert the rotational mechanical energy to electrical energy, which is fed into a utility grid. Gearless direct drive wind turbine generators also exist. The rotor, generator, gearbox and other components are typically mounted within a housing, or nacelle, that is positioned on top of a base that may be a truss or tubular tower.

The gearboxes need to be lubricated to function effectively. Typically, oils are used for lubrication in a gearbox, and the oil heats up during operation of the gearbox. A heat exchanger can be used to cool the oil, and a suction pipe typically exits the gearbox and feeds into a circulating pump. The circulating pump is used to force the oil through the heat exchanger, and the cooled oil is then directed back to the gearbox.

In extremely cold environments (e.g., less than about −10 degrees C.), the lubrication oil used in the gearbox can become very viscous or thick. This cold and viscous oil resists flow and the circulating pump can be damaged if run when the oil is very cold. In some known solutions an external heater and pump are connected to the oil sump of the gearbox. This oil sump heater takes a long time to heat up all the oil in the gearbox sump and requires a large amount of energy. The result is a long delay during cold weather operation, waiting for the oil to come up to a minimum temperature, until the wind turbine can begin producing power, as well as lower overall efficiency due to the large power drain imposed by the oil sump pump/heater.

Accordingly, a need exists in the art for a system that will quickly heat the oil entering a circulating pump used with a gearbox, and that does not require a large amount of power or time to operate.

BRIEF DESCRIPTION OF THE INVENTION

In one aspect of the present invention a wind turbine is provided comprising a gearbox containing a lubrication medium, a pump for circulating the lubrication medium, and a gearbox lubrication suction pipe for transporting the lubrication medium from the gearbox to the pump. A heater is in thermal connection to, at least a portion of, the gearbox lubrication suction pipe. This heater is used to heat the lubrication medium contained within the gearbox lubrication suction pipe to a temperature where damage to the pump is avoided.

In another aspect, a wind turbine is provided comprising a gearbox containing a lubrication medium, a pump for circulating the lubrication medium, and a gearbox lubrication suction pipe for transporting the lubrication medium from the gearbox to the pump. A heater is located on, at least portions of, the gearbox lubrication suction pipe. The heater is used to heat the lubrication medium contained within the gearbox lubrication suction pipe to a temperature where damage to the pump is avoided.

In a further aspect, a heating system for a lubrication medium used in a gearbox is provided. The system comprises a pump for circulating a lubrication medium, heating means for heating a portion of the lubrication medium and a suction pipe connected between the gearbox and the pump. The suction pipe is used for transporting the lubrication medium from the gearbox to the pump. A temperature monitoring system for monitoring a first temperature activates the heating means when the first temperature is below a threshold value.

DETAILED DESCRIPTION OF THE INVENTION

Figure 1:
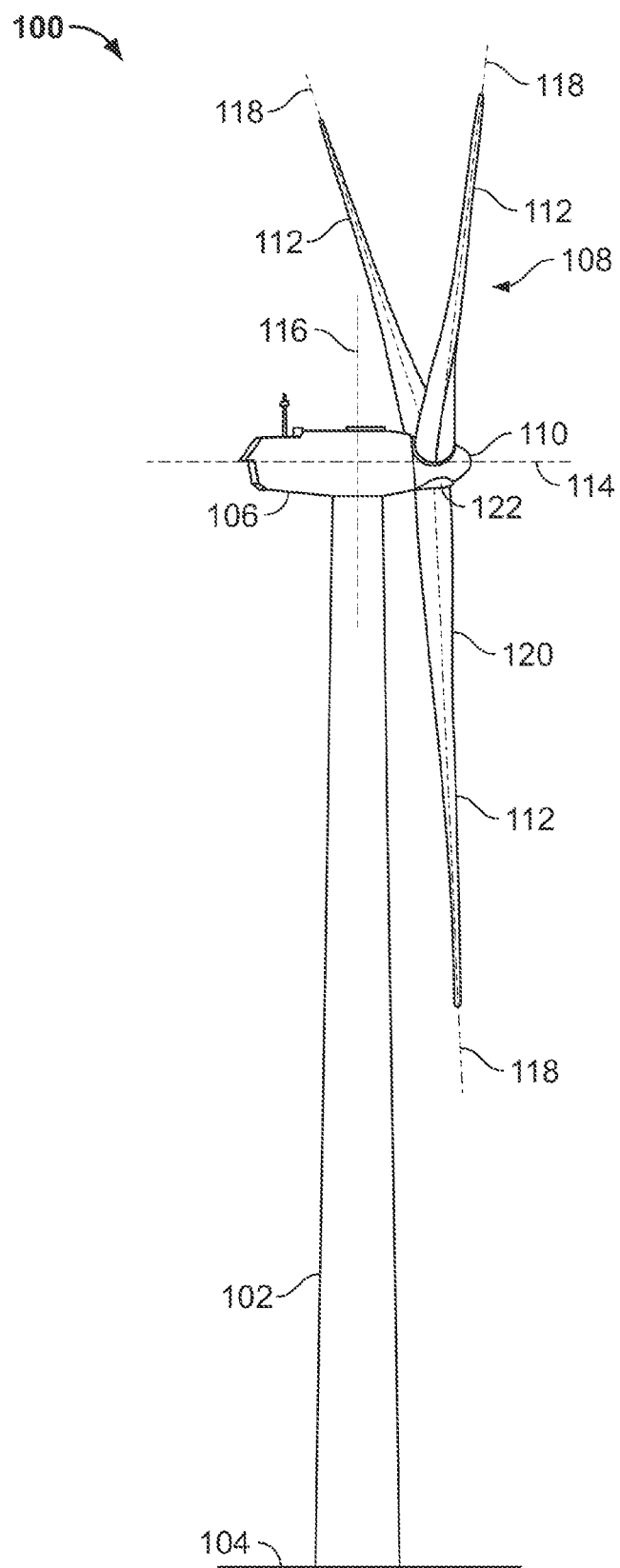
FIG. 1 is a schematic illustration of an exemplary wind turbine generator.

FIG. 1 is a schematic illustration of an exemplary wind turbine 100. In the exemplary embodiment, wind turbine 100 is a horizontal axis wind turbine. Alternatively, wind turbine 100 may be a vertical axis wind turbine. Wind turbine 100 has a tower 102 extending from a supporting surface 104, a nacelle 106 mounted on tower 102, and a rotor 108 coupled to nacelle 106. Rotor 108 has a rotatable hub 110 and a plurality of rotor blades 112 coupled to hub 110. In the exemplary embodiment, rotor 108 has three rotor blades 112. In an alternative embodiment, rotor 108 may have more or less than three rotor blades 112. In the exemplary embodiment, tower 102 is fabricated from tubular steel and has a cavity (not shown in FIG. 1) extending between supporting surface 104 and nacelle 106. In an alternate embodiment, tower 102 is a lattice tower. The height of tower 102 is selected based upon factors and conditions known in the art.

Blades 112 are positioned about rotor hub 110 to facilitate rotating rotor 108 to transfer kinetic energy from the wind into usable mechanical energy, and subsequently, into electrical energy. Blades 112 are mated to hub 110 by coupling a blade root portion 120 to hub 110 at a plurality of load transfer regions 122. Load transfer regions 122 have a hub load transfer region and a blade load transfer region (both not shown in FIG. 1). Loads induced in blades 112 are transferred to hub 110 via load transfer regions 122.

In the exemplary embodiment, blades 112 have a length between about 50 meters (m) (164 feet (ft)) and about 100 m (328 ft). Alternatively, blades 112 may have any length. As the wind strikes blades 112, rotor 108 is rotated about rotation axis 114. As blades 112 are rotated and subjected to centrifugal forces, blades 112 are subjected to various bending moments and other operational stresses. As such, blades 112 may deflect and/or rotate from a neutral, or non-deflected, position to a deflected position and associated stresses, or loads, may be induced in blades 112. Moreover, a pitch angle of blades 112, i.e., the angle that determines blades 112 perspective with respect to the direction of the wind, may be changed by a pitch adjustment mechanism (not shown in FIG. 1) to facilitate increasing or decreasing blade 112 speed by adjusting the surface area of blades 112 exposed to the wind force vectors. Pitch axes 118 for blades 112 are illustrated. In the exemplary embodiment, the pitches of blades 112 are controlled individually. Alternatively, the pitches of blades 112 may be controlled as a group.

In some configurations, one or more microcontrollers in a control system (not shown in FIG. 1) are used for overall system monitoring and control including pitch and rotor speed regulation, yaw drive and yaw brake application, and fault monitoring. Alternatively, distributed or centralized control architectures are used in alternate embodiments of wind turbine 100.

Figure 2:
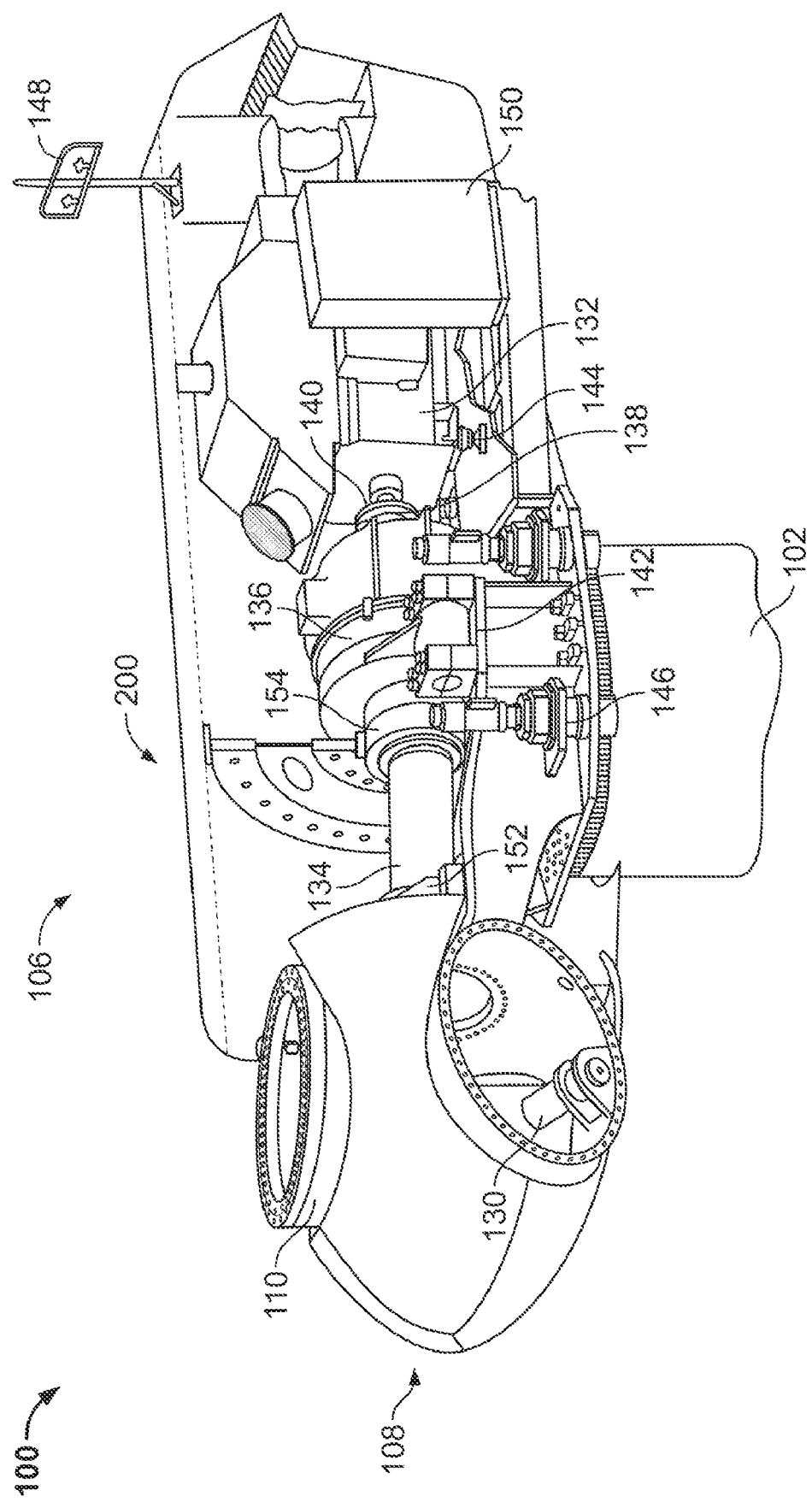
FIG. 2 is a fragmentary cross-sectional schematic illustration of a nacelle that may be used with the exemplary wind turbine generator shown in FIG. 1.

FIG. 2 is a fragmentary cross-sectional schematic view of nacelle 106 of exemplary wind turbine 100. Various components of wind turbine 100 are housed in nacelle 106 atop tower 102 of wind turbine 100. Pitch drive mechanisms 130 (only one illustrated in FIG. 2) modulates the pitch of blades 112 along pitch axis 118 (both shown in FIG. 1).

Rotor 108 is rotatably coupled to an electric generator 132 positioned within nacelle 106 via rotor shaft 134, sometimes referred to as low speed shaft 134, a gearbox 136, a high speed shaft 138, and a coupling 140. Forward and aft support bearings 152 and 154, respectively, are positioned within and are supported by nacelle 106. Bearings 152 and 154 facilitate radial support and alignment of shaft 134. Rotation of shaft 134 rotatably drives gearbox 136 that subsequently rotatably drives shaft 138. Typically, a lubrication oil is used within gearbox 136. Shaft 138 rotatably drives generator 132 via coupling 140 and shaft 138 rotation facilitates generator 132 production of electrical power. Gearbox 136 and generator 132 are supported by supports 142 and 144, respectively. In the exemplary embodiment, gearbox 136 utilizes a dual path geometry to drive high speed shaft 138. Alternatively, main rotor shaft 134 is coupled directly to generator 132 via coupling 140.

Also positioned in nacelle 106 is a yaw adjustment mechanism 146 that may be used to rotate nacelle 106 and rotor 108 on axis 116 (shown in FIG. 1) to control the perspective of blades 112 with respect to the direction of the wind. Mechanism 146 is coupled to nacelle 106. Meteorological mast 148 includes a wind vane and anemometer (neither shown in FIG. 2). Mast 148 is positioned on nacelle 106 and provides information to the turbine control system that may include wind direction and/or wind speed. In alternative embodiments, mast 148 can be mounted on hub 110 and extend in a direction in front of rotor 108.

A portion of the turbine control system resides within control panel 150. The turbine control system (TCS) controls and monitors various systems and components of wind turbine 100. A plurality of sensors are distributed throughout wind turbine 100 and the status of various conditions (e.g., vibration level, temperature, etc.) are monitored. The sensed conditions are utilized by the TCS to control various subsystems of wind turbine 100. In one example, the ambient temperature or temperature of the oil in the gearbox sump can be sensed and compared to a lower threshold value. If the temperature of either or both of these values is below the threshold, a heater could be activated to warm the gearbox oil to above the threshold value. When a higher predetermined value (e.g., minimum recommended operating temperature of gearbox lubricating oil) is reached the heater may be deactivated.

Figure 3:
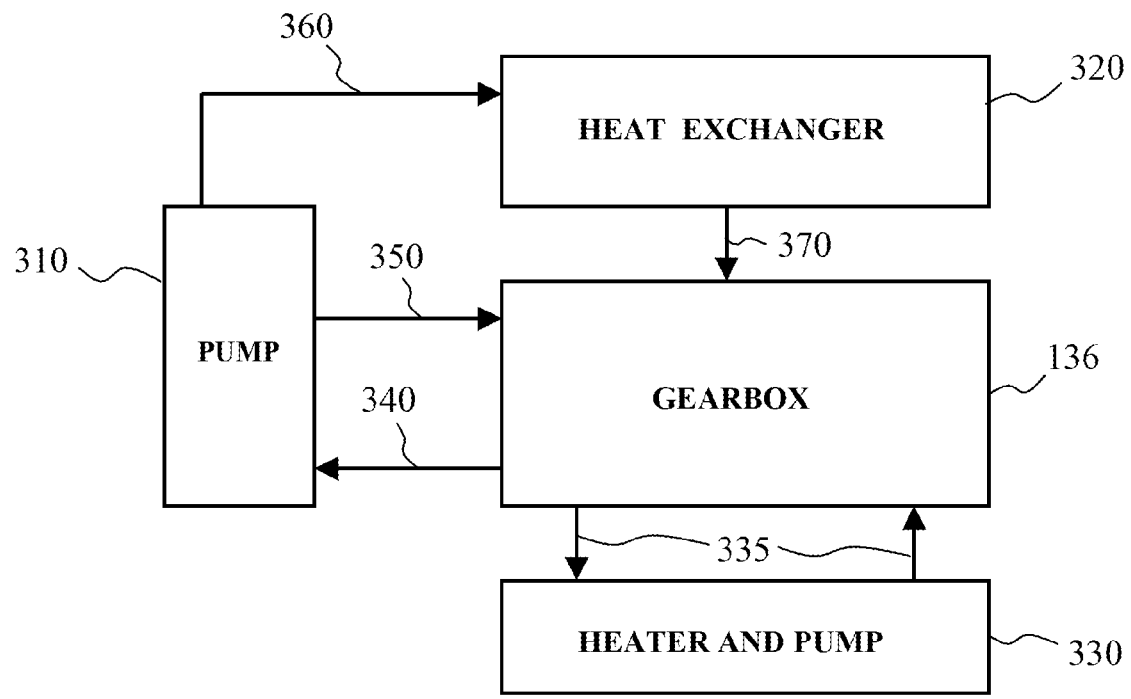
FIG. 3 is a block diagram illustration of a prior art gearbox lubrication heating system.

Gearboxes typically need lubrication to function effectively. This lubrication is often in the form of an oil. When oil is warm, it flows readily and is non-viscous, but when oil is cold it becomes viscous and resists flow. Referring to FIG. 3, many known gearboxes use a circulating pump 310 to circulate warm or hot oil through a heat exchanger 320. The heat exchanger is used to cool lubricating oil, and then returns the cooled oil back to the gearbox 136.

In cold weather operation (e.g., less than about −10 degrees C.), the lubricating oil used in the gearbox becomes very viscous. The circulating pumps 310 used in conjunction with gearboxes can be damaged by the viscous oil. For example, the vanes of the pump could break when forced to pump viscous fluids (e.g., lubricating oils). The term "cold" is somewhat relative and refers to a temperature when a lubricating medium becomes viscous. For example, some lubricating oils may become viscous at about +10 degrees C. The present invention can be used at any temperature and/or in any application where a viscous lubricating medium needs to be heated to become less viscous.

In some known solutions to this problem, and as illustrated in FIG. 3, an external heater and pump 330 is connected to the oil sump of gearbox 136. Typically, two pipes 335 are connected between the heater and pump 330 and the oil sump of gearbox 136. One pipe 335 transfers oil from the gearbox to the heater and pump 330, and the other pipe 335 returns warmed oil back to the oil sump of gearbox 136.

Once the oil in gearbox 136 has warmed to a minimum operating temperature, pump 310 can be energized and transfer oil out of gearbox 136 via suction pipe 340. Pump 310 can include an internal valve (not shown) for selectively discharging oil into gearbox return pipe 350 or into heat exchanger input pipe 360. Typically, when the oil in gearbox heats up enough to require cooling by heat exchanger 320, it is normally returned to gearbox 136 via pipe 370. In alternative embodiments, the oil may pass through pump 310 before returning to gearbox 136.

Given enough time and power the system illustrated in FIG. 3 does work, although it takes a long time to heat all the oil in the oil sump to a minimum operating temperature. A large amount of power is also required during this process. The disadvantages to this approach include the large amount of power required to operate the heater and pump 330, the capital cost of the heater and pump 330 components, the long time period required to heat the oil and the lost income from waiting to operate the machinery (e.g., a wind turbine). This last factor can have a large impact in wind farms that may comprise hundreds of wind turbines. Every minute lost in generating power adds up to a substantial monetary amount when factored over the course of a year and multiplied by the number of turbines in a typical wind farm.

Figure 4:
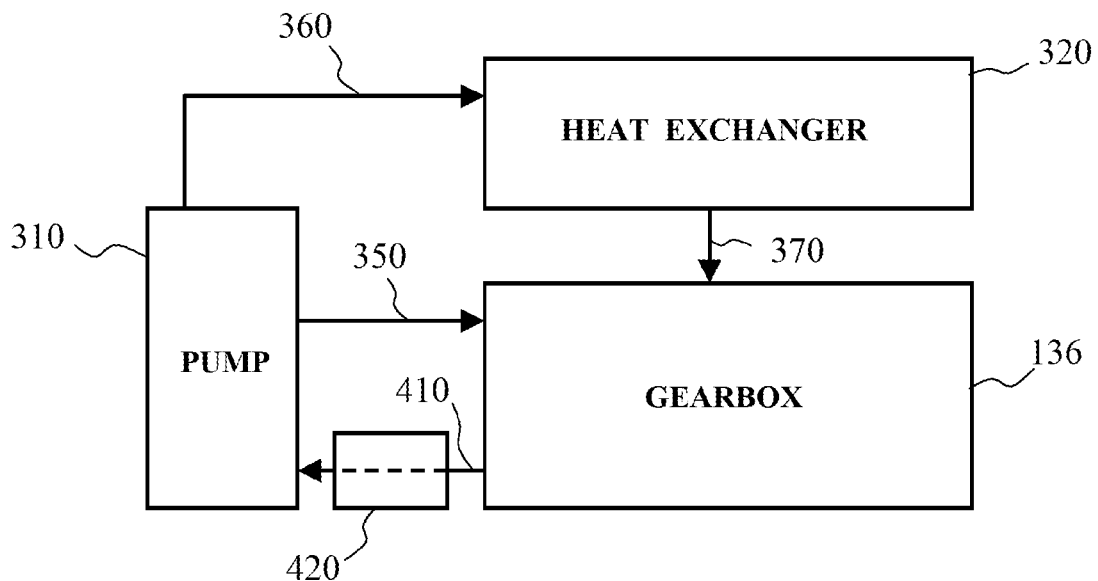
FIG. 4 is a block diagram illustration of the lubrication heating system according to one embodiment of the present invention.

FIG. 4 illustrates one embodiment of the present invention that drastically reduces the time required to start operating a wind turbine in cold environments. The weakest link in the system shown in FIG. 4 is the pump 310. This pump 310 is the most likely element to fail in cold weather environments. The cause of this failure is most often associated with viscous oil or lubricant. The viscous oil causes the vanes (or other parts) of pump 310 to break. The solution, as embodied by aspects of the present invention, is to heat up the oil just before it enters pump 310. There is no need to heat up all the oil in the gearbox 136 first. The oil located in oil sump outlet pipe 410 consists of a small amount of oil and a low thermal mass, when compared to the total oil capacity of the oil contained in gearbox 136. In alternative embodiments, oil sump outlet pipe 410 could be located at any point on the gearbox 136, as long as a supply of oil can be transferred to pump 310.

A heated wrap 420 can be placed around pipe 410, and this wrap 420 can be used to heat the oil contained within pipe 410. The heated wrap 420 can be a blanket like device having electrically heated wires or cables, a hot air jacket or heat transfer device. The heated wrap 420 could also be embedded within the walls of pipe 410 (e.g., electrically powered heating wires within the pipe wall). A portion or the entirety of pipe 410 can be covered with the heated wrap 420. The heated wrap 420 can be attached to pipe 410 with any suitable fasteners (e.g., hook and loop, cable ties, magnets, etc.). Power can be supplied via a standard electrical plug (not shown) and the wrap 420 can be configured to run on AC or DC power.

One major advantage to this system is that only a small amount of power is needed to power heated wrap 420. Another advantage is that since only a small amount of oil is heated (i.e., only the oil contained within pipe 410) the resulting low thermal mass of oil heats up very quickly. The pump 310 is constantly fed a supply of warm oil and can begin operation much faster than in the system shown in FIG. 3. Another advantage is that the wind turbine can begin to operate sooner, thereby the oil present in gearbox 136 will begin to heat up via frictional forces and aid in the oil warming process.

Figure 5:
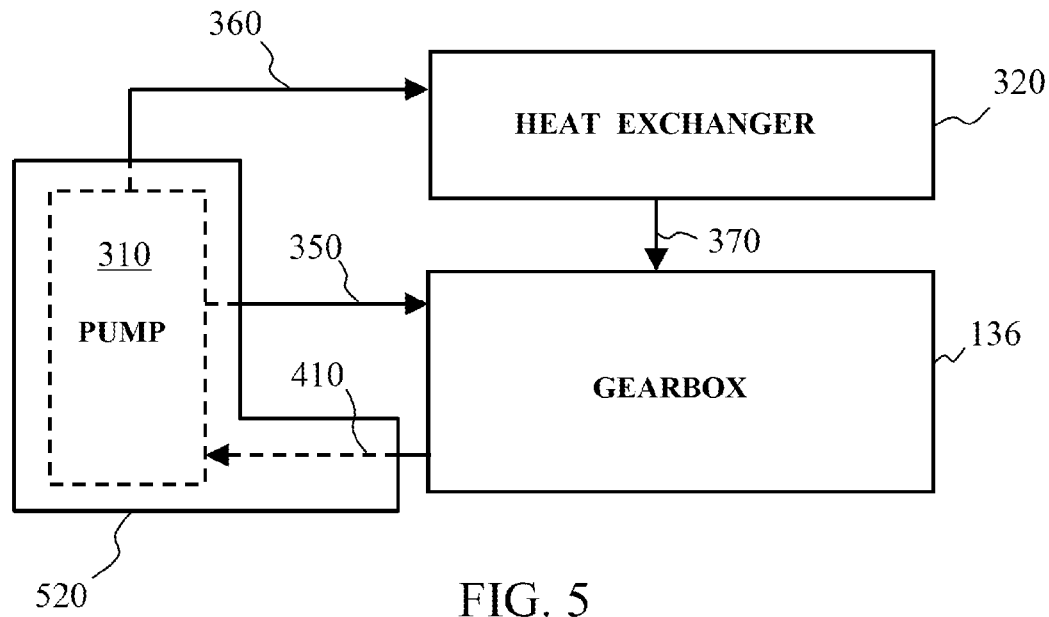
FIG. 5 is a block diagram illustration of the lubrication heating system according to another embodiment of the present invention.

FIG. 5 illustrates another embodiment of the present invention. Heated wrap 520 comprises a heated cover that covers pump 310 and pipe 410. In alternative embodiments, the heated wrap 520 may cover all or a portion of pump 310 and/or all or a portion of pipe 410. The heated wrap may comprise a single piece or may comprise two or more individual pieces that can be used to cover all or portions of pump 310 and/or pipe 410. The heated wrap 520 could also be extended to cover all or a portion of pump outlet pipe 350. Heating the oil exiting the pump 310 and entering gearbox 136 via pipe 350 could benefit the pump by reducing the pushing resistance experienced by the pump.

In alternative embodiments the heated wrap could be configured to cover all or a portion of gearbox 136. In one embodiment, only the lower portion of the gearbox could be heated, and in other embodiments the entire gearbox, or majority of the gearbox could be heated by one or more heated wraps. It is also contemplated by aspects of the present invention that one or more wraps could be used to cover and heat, all or portions of, the gearbox 136, outlet pipe 410, pump 310, and inlet pipe 350.

As described above in conjunction with FIG. 4, heated wrap 520 can be comprised of a blanket like device having electrically heated wires or cables, a hot air jacket or heat transfer device. The heated wrap 520 could also be embedded within the walls of pipe 410 (e.g., electrically powered heating wires within the pipe wall) and/or the casing of pump 310. A portion of or the entirety of pipe 410 and/or pump 310 can be covered with the heated wrap 520. The heated wrap 520 can be attached to pipe 410 and/or pump 310 with any suitable fasteners (e.g., hook and loop, cable ties, magnets. etc.). Power can be supplied via a standard electrical plug (not shown) and the wrap 520 can be configured to run on AC or DC power.

Figure 6:
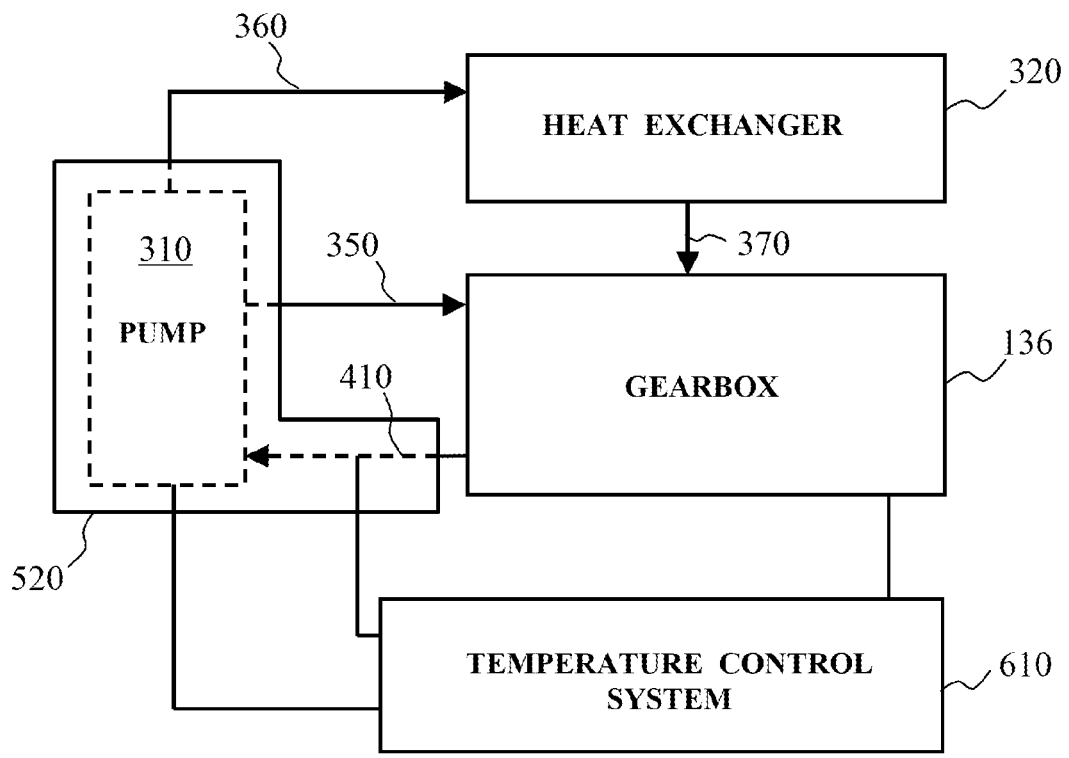
FIG. 6 is a block diagram illustration of the lubrication heating system according to yet another embodiment of the present invention.

Referring to FIG. 6, the temperature control system 610 can be utilized to monitor and control the heated wrap 420, 520. A plurality of temperature monitoring sensors can be used to monitor the temperature of the oil in the gearbox, the temperature of the oil in pipe 410, the temperature of pipe 410, the temperature of the oil in pump 310, the temperature of pump 310 and the ambient temperature. Based on the data received, the temperature control system can determine if the heated wrap should be activated. As one example, if the ambient temperature was about −10 degrees C and the oil temperature in the gearbox sump and/or the oil temperature in the suction pipe 410 was below a predetermined threshold value, then the heated wrap 420, 520 could be energized. Readings would be monitored at predetermined intervals, and when the oil reached a specific temperature, then the heated wrap could be deactivated.

In some applications, the pipes or hoses used in a gearbox system are formed of a rubber or elastomeric material, and this rubber material can be damaged by oil that is too hot. It will be understood that the terms "pipe" or "pipes" and "hose" or "hoses" are used interchangeably, and the present invention can be applied to any type of pipe or hose used in a machine requiring the lubrication medium to be heated. Additional aspects of the present invention can be utilized to monitor the temperature of pipe 410, and if this temperature exceeded or was approaching a maximum recommended temperature (i.e., the oil was making the pipe or hose too hot), then the heated wrap could be deactivated. The temperature control system may also decide to instruct pump 310 to route the oil through heat exchanger 320 to cool the oil. In additional embodiments, the heated wrap itself could contain a self-regulating device that deactivates itself when an over-temperature condition is approaching. The temperature control system 610 could also be controlled by the turbine control system (TCS). In some wind turbines the TCS monitors and controls a variety of subsystems (e.g. pitch motors, yaw drive, power converter, etc.).

In additional aspects of the present invention, the wrap 420, 520 could comprise heating and/or cooling means. The cooling means could be used if the oil in pipe 410 or pump 310 became too hot. In some applications, it may be possible for oil, over a predetermined temperature, to damage the pipe 410 and/or pump 310. Accordingly, a cooling means integrated with wrap 420, 520 could be used to cool oil which has become too hot. The cooling means could comprise a length of conduit or tubing that contains a heat transfer medium. The conduit could be connected to an external or internal heat exchanger, or to a refrigeration device. In one example embodiment, the conduit used for cooling could be connected to heat exchanger 320.

The various aspects of the present invention herein described provide a system for quickly and efficiently heating or cooling the lubrication medium (e.g., oil) used in gearboxes. The oil is heated prior to entering the circulating pump and only a small thermal mass of oil is heated (i.e., compared to the entire volume of oil used for gearbox lubrication). The result is a very quick start up time for machines utilizing gearboxes in cold weather environments. Any engine, vehicle or machine requiring a gearbox could employ the invention herein described. One application is in the use of wind turbines, and the present invention enables a quick start-up time during cold weather operation, while reducing the costs of prior solutions.

While the invention has been described in terms of various specific embodiments, those skilled in the art will recognize that the invention can be practiced with modification within the spirit and scope of the claims.

What is claimed is:

1. A wind turbine comprising:
    a gearbox containing a lubrication medium;
    a pump for circulating said lubrication medium;
    a gearbox lubrication suction pipe for transporting said lubrication medium from said gearbox to said pump;
    a heater in thermal connection to, at least a portion of, said gearbox lubrication suction pipe;
    wherein, said heater is used to heat said lubrication medium contained within said gearbox lubrication suction pipe to a temperature where damage to said pump is avoided.

2. The wind turbine of claim 1, wherein said lubrication medium comprises oil.

3. The wind turbine of claim 1, wherein said pump transports said lubrication medium to said gearbox.

4. The wind turbine of claim 1, further comprising:
a temperature control system for monitoring the temperature of said gearbox lubrication suction pipe;
wherein, power supplied to said heater is limited if said temperature approaches a level where damage may occur to said gearbox lubrication suction pipe.

5. The wind turbine of claim 1, further comprising:
a temperature control system for monitoring at least one temperature;
wherein, power supplied to said heater is limited if said at least one temperature approaches a predetermined level.

6. The wind turbine of claim 5, wherein said at least one temperature is chosen from the group comprising, at least one of:
external ambient temperature, lubrication medium temperature, and suction pipe temperature.

7. The wind turbine of claim 1, wherein said heater is comprised of a heated blanket, wherein said heated blanket covers, at least a portion of, said gearbox lubrication suction pipe.

8. The wind turbine of claim 1, wherein said heater comprises heating wires, said heating wires embedded within said gearbox lubrication suction pipe.

9. The wind turbine of claim 1, wherein said heater comprises a hot air jacket, said hot air jacket disposed around, at least a portion of said gearbox lubrication suction pipe.

10. A wind turbine comprising:
a gearbox containing a lubrication medium;
a pump for circulating said lubrication medium;
a gearbox lubrication suction pipe for transporting said lubrication medium from said gearbox to said pump;
a heater located on, at least a portion of, said gearbox lubrication suction pipe;
wherein, said heater is used to heat said lubrication medium contained within said gearbox lubrication suction pipe to a temperature where damage to said pump is avoided.

11. The wind turbine of claim 10, wherein said wind turbine comprises:
a temperature control system for monitoring the temperature of said gearbox lubrication suction pipe;
wherein, power supplied to said heater is limited if said temperature approaches a level where damage may occur to said gearbox lubrication suction pipe.

12. The wind turbine of claim 10, further comprising:
a temperature control system for monitoring at least one temperature, said at least one temperature chosen from the group comprising, at least one of: external ambient temperature, lubrication medium temperature, and suction pipe temperature;
wherein, power supplied to said heater is limited if said at least one temperature approaches a predetermined level.

13. The wind turbine of claim 10, wherein said lubrication medium comprises oil.

14. A heating system for a lubrication medium used in a gearbox, said system comprising:
a pump for circulating said lubrication medium;
heating means for heating a portion of said lubrication medium;
a suction pipe connected between said gearbox and said pump, said suction pipe for transporting said lubrication medium from said gearbox to said pump;
a temperature monitoring system for monitoring a first temperature;
wherein, said temperature monitoring system activates said heating means when said first temperature is below a threshold value.

15. The heating system of claim 14, wherein said heating means comprises a heated cover, said heated cover disposed over, at least a portion of, said suction pipe.

16. The heating system of claim 14, wherein said heating means comprises heating wires, said heating wires embedded within said suction pipe.

17. The heating system of claim 14, wherein said heating means comprises a hot air jacket, said hot air jacket disposed around, at least a portion of, said suction pipe.

18. The heating system of claim 14, wherein said first temperature is chosen from the group comprising, at least one of:
external ambient temperature, lubrication medium temperature, and suction pipe temperature.

19. The heating system of claim 14, wherein said temperature monitoring system further comprises:
a suction pipe sensor for monitoring the temperature of said suction pipe;
wherein, said temperature monitoring system limits power to said heating means if the temperature of said suction pipe exceeds a predetermined threshold value.

20. The heating system of claim 14, wherein said lubrication medium comprises oil.

* * * * *